United States Patent
Sakakibara

(10) Patent No.: US 6,197,870 B1
(45) Date of Patent: Mar. 6, 2001

(54) HARD-TYPE HIGH-STRUCTURE CARBON BLACK AND RUBBER COMPOSITION COMPRISING SAME

(75) Inventor: Akihiro Sakakibara, Nagoya (JP)

(73) Assignee: Tokai Carbon Company, Ltd., Tokyo (JP)

( * ) Notice: Subject to any disclaimer, the term of this patent is extended or adjusted under 35 U.S.C. 154(b) by 0 days.

(21) Appl. No.: 09/384,693

(22) Filed: Aug. 27, 1999

(30) Foreign Application Priority Data

Sep. 7, 1998 (JP) .................................................. 10-252175

(51) Int. Cl.$^7$ ....................................................... C08K 3/00
(52) U.S. Cl. ........................ 524/496; 524/495; 423/448.1
(58) Field of Search ..................... 524/495, 496; 423/449.1

(56) References Cited

U.S. PATENT DOCUMENTS 5,688,317 * 11/1997 Mackay et al. ....................... 106/426
5,877,250 * 3/1999 Sant ..................................... 524/496

\* cited by examiner

Primary Examiner—Edward J. Cain
(74) Attorney, Agent, or Firm—Flynn, Thiel, Boutell & Tanis, P.C.

(57) ABSTRACT

A hard-type high-structure carbon black capable of providing the rubber comprising the carbon black with a high modulus, superior abrasion resistance, and gripping performance, exhibiting high abrasion resistance corresponding to the modulus, and suitable for tire treads, and a rubber composition. The hard-type high-structure carbon black of the present invention having characteristics of $70 \leq CTAB \leq 250$, $130 \leq DBP$, $115 \leq 24M4DBP$, $DBP-24M4DBP \leq 40$, $\Delta Dst/Dst \leq 0.8$, and a correlation factor f calculated by the following formula (1) satisfying the following formula (2).

$$f = (Tint/CTAB) \cdot (24M4DBP/Dst)/(N_2SA/IA) \quad (1)$$

$$1.2 \leq f \leq 1.6 \quad (2)$$

The rubber composition comprising 20–150 parts by weight of the above carbon black for 100 parts by weight of natural rubbers, synthetic rubbers, or blends of these rubbers.

6 Claims, 5 Drawing Sheets

Time T (sec)

Dst (nm)

HARD-TYPE HIGH-STRUCTURE CARBON BLACK AND RUBBER COMPOSITION COMPRISING SAME

BACKGROUND OF THE INVENTION

1. Field of the Invention

The present invention relates to hard-type high-structure carbon black which is capable of providing a rubber with a high modulus and excellent abrasion resistance and suitable for use in tire treads for various automobiles, and to a rubber composition comprising the carbon black.

2. Description of Background Art

Various kinds of carbon black possessing various respective characteristics have been used for rubber reinforcement. Performance of rubber compositions comprising carbon black is mainly determined by the characteristics of the carbon black. Therefore, carbon black having characteristics suitable for the purpose of the application has been selectively blended with rubbers.

In recent years, low fuel consumption tires have been developed to deal with demands for saving resources and energy. As such low fuel consumption tires, a rubber composition comprising a relatively small amount of carbon black with a large particle diameter which exhibits low heat build-up and high impact resilience is effective. However, although the blend of carbon black having a large particle diameter and a small specific surface area is effective for achieving low fuel consumption, a decrease in properties such as braking characteristics (handling stability) and abrasion resistance is unavoidable.

It is necessary to increase the hysteresis loss of the rubber composition in order to improve handling stability and provide high gripping performance. As a method of increasing the hysteresis loss of the rubber composition for tread, a method of filling a large amount of carbon black into a styrene-butadiene copolymer rubber (SBR) containing a large amount of bonded styrene has been employed. However, hardness of the rubber composition comprising a large amount of carbon black becomes so high that the frictional resistance to the road surface decreases. Moreover, such a rubber composition generates a remarkable amount of heat during travel, causing the rubber structure to deteriorate.

As described above, improvement of the gripping performance and abrasion resistance of tire tread is limited only by the amount of the rubber components and carbon black blended into the tire. Therefore, improvement of these rubber properties from the viewpoint of the characteristics of the carbon black has been attempted. Given as examples of such attempts are a radial tire for passenger cars comprising a rubber composition which comprises carbon black with a $\Delta Dst/Dst$ of 0.7 or more for 100 parts by weight of a blended rubber of an SBR characterized in the amount of bonded styrene, amount of a vinyl bond at a butadiene site, and the like and other diene rubbers (Japanese Patent Application Laid-open No. 248441/1990); hard rubber black for achieving both superior gripping performance and excellent abrasion resistance, having a nitrogen adsorption specific surface area ($N_2SA$) of 120–165 m$^2$/g and a DBP absorption number of 120 ml/100 g or more in which a characteristic relation value (G value) for controlling the degree of surface activity and reducing the particle diameter is limited (Japanese Patent Application Laid-open No. 32137/1990); a rubber composition exhibiting superior abrasion resistance and excellent gripping performance with a small specific surface area and a small DBP absorption number, exhibiting superior abrasion resistance with a large specific surface area without either processability or abrasion resistance being impaired by mixing carbon black with a Dst of 70 or less, a nitrogen adsorption specific surface area/iodine adsorption number of 0.85–0.98, and a DBP absorption-24M4DBP of less than 20 (Japanese Patent Application Laid-open No. 174470/1991); and the like.

As a rubber composition exhibiting superior abrasion resistance and excellent gripping performance, Japanese Patent Application Laid-open No. 256577/1994 discloses a rubber composition comprising 50–180 parts by weight of carbon black having the following selective characteristics (1)–(5) for 100 parts by weight of diene rubber components.
(1) $140 \leq CTAB \leq 180$, (2) $-10 \leq N_2SA-IA \leq 0$,
(3) $110 \leq 24M4DBP \leq 130$, (4) $20 \leq DBP-24M4DBP \leq 40$,
(5) $\Delta Dst \leq 0.5Dst+23$ As a method of providing high abrasion resistance in a rubber comprising carbon black, a method of increasing the structure of the carbon black has been considered to be effective. However, a sufficient increase in 24M4DBP which is an index of the structure level in the rubber cannot be achieved only by increasing the structure (increased DBP). Moreover, if the 24M4DBP value increases to a certain level, since the distribution of the aggregate tends to be broader as the 24M4DBP value increases, abrasion resistance is insufficient compared with the high 24M4DBP value.

Since abrasion resistance is generally improved in proportion to an increase in a modulus, improvement of abrasion resistance has resulted from the increase in a modulus to some extent. Rubber products are usually used by adjusting the modulus level to a predetermined level. Therefore, when the rubber is blended by being adjusted to a predetermined modulus level, improvement of abrasion resistance has been insufficient at such a modulus level.

Furthermore, a demand for low fuel consumption automobiles has become more and more important in view of environmental pollution. For example, reduction of the amount of carbon black to be included to provide lightweight tires, specifically, improvement of abrasion resistance by improving the characteristics of the carbon black has been demanded. Moreover, a higher modulus, superior abrasion resistance, and excellent gripping performance have been required for high performance tires accompanied by the development of high performance automobiles.

SUMMARY OF THE INVENTION

The present invention has been achieved to solve these problems. An object of the present invention is to provide hard-type high-structure carbon black which exhibits superior dispersibility in a rubber, is capable of providing a rubber comprising the carbon black with a high modulus, superior abrasion resistance, and excellent gripping performance, exhibits high abrasion resistance corresponding to a fixed modulus level, and is suitable for use in tire treads for various automobiles, and a rubber composition comprising the carbon black.

The hard-type high-structure carbon black according to the present invention has the characteristics of $70 \leq CTAB \leq 250$, $130 \leq DBP$, $115 \leq 24M4DBP$, $DBP-24M4DBP \leq 40$, $\Delta Dst/Dst \leq 0.8$, and a correlation factor f calculated by the following formula (1) satisfying the following formula (2):

$$f=(Tint/CTAB)\cdot(24M4DBP/Dst)/(N_2SA/IA) \qquad (1)$$

$$1.2 \leq f \leq 1.6 \qquad (2)$$

wherein CTAB represents a CTAB specific surface area ($m^2/g$), DBP represents a DBP absorption number (ml/100 g), 24M4DBP represents a compressed DBP absorption number (ml/100 g), Dst represents a mode diameter (nm) of stoke diameter distribution of a carbon black aggregate measured by a disk centrifuge apparatus (DCF), ΔDst represents a half-width (nm) of the stoke diameter distribution, Tint represents specific tinting strength (%), $N_2SA$ represents a nitrogen adsorption specific surface area ($m^2/g$), and IA represents iodine adsorption number (mg/g).

The rubber composition of the present invention comprises 20–150 parts by weight of the above hard-type high-structure carbon black for 100 parts by weight of natural rubbers, synthetic rubbers, or blends of these rubbers.

Other objects, features and advantages of the invention will hereinafter become more readily apparent from the following description.

DETAILED DESCRIPTION OF THE INVENTION AND PREFERRED EMBODIMENT

Figure 1:
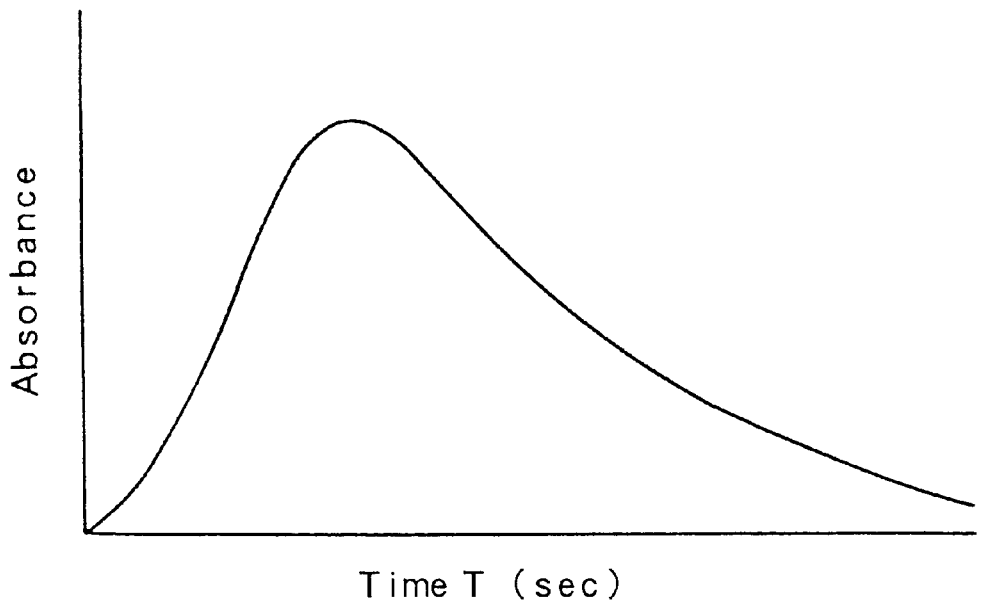
FIG. 1 is a distribution curve showing time elapsed after the addition of a liquid dispersion of carbon black and variation of absorbance caused by centrifugal sedimentation of carbon black in the measurement of Dst.

According to the hard-type high-structure carbon black of the present invention, the following characteristics of $70 \leq CTAB \leq 250$, $130 \leq DBP$, $115 \leq 24M4DBP$, $DBP-24M4DBP \leq 40$, and $\Delta Dst/Dst \leq 0.8$ are preconditions for improving dispersibility of the carbon black in a rubber and providing the rubber comprising the carbon black with a good balance of high degree of reinforcement and abrasion resistance.

The CTAB specific surface area from 70–250 $m^2/g$ is a range of a particle diameter of the carbon black suitable for use in tire treads. If the CTAB is less than 70 $m^2/g$, reinforcement and abrasion resistance of the rubber used as tire tread are insufficient; on the other hand, if more than 250 $m^2/g$, dispersibility of the carbon black in the rubber and processability of the rubber significantly decrease. The CTAB is preferably set in a range of $70 \leq CTAB \leq 200$.

$130 \leq DBP$ and $115 \leq 24M4DBP$ are preconditions for improving dispersibility of the carbon black in the rubber and forming a structure for providing high hardness and a high modulus. If the DBP absorption number is less than 130 ml/100 g and the 24M4DBP absorption number is less than 115 ml/100 g, shear stress at the time of blending and mixing the carbon black with the rubber components becomes insufficient, whereby the modulus and abrasion resistance decrease due to low dispersibility of the carbon black in the rubber.

$DBP-24M4DBP \leq 40$ is a precondition for strength of the structure. If the difference between the DBP absorption number and the 24M4DBP absorption number exceeds 40 ml/100 g, the structure is significantly damaged at the time of blending and mixing the carbon black with the rubber components, thereby resulting in decreased dispersibility of the carbon black in the rubber and reduced processability. DBP-24M4DBP is preferably set at 35 ml/100 g or less.

$\Delta Dst/Dst \leq 0.8$ is a precondition concerning the size distribution of the aggregate. If this value exceeds 0.8, the width of the stoke diameter distribution of the aggregate becomes great, whereby abrasion resistance per fixed modulus is reduced due to the broadened distribution when prepared as a rubber composition. ΔDst/Dst is preferably set at 0.75 or less.

In addition to these preconditions, in the hard-type high-structure carbon black of the present invention, a correlation factor f calculated from formula (1); $f=(Tint/CTAB) \cdot (24M4DBP/Dst)/(N_2SA/IA)$ must be in the range of formula (2); $1.2 \leq f \leq 1.6$.

The correlation factor f is a requirement for providing the rubber comprising the carbon black with relatively high gripping performance and abrasion resistance when the modulus level of the rubber is fixed. In the formula (1), each factor represents the following functional effects.

① Tint/CTAB

This factor represents properties of the carbon black particles. Specific tinting strength (Tint) is an index showing the size of the carbon black aggregate. By dividing the specific tinting strength by the CTAB specific surface area, the aggregate per fixed area is determined. The size of the aggregate becomes more uniform as this value (Tint/CTAB) increases, whereby gripping performance per fixed modulus increases in the rubber composition.

② 24M4DBP/Dst

This factor represents properties of the carbon black particles. The 24M4DBP absorption number is an index showing the size of the carbon black structure. By dividing the 24M4DBP absorption number by the stoke mode diameter Dst of the aggregate, the development of the structure per aggregate diameter is determined. The structure develops more as this value (24M4DBP/Dst) increases, whereby abrasion resistance per fixed modulus increases in the rubber composition.

③ $N_2SA/IA$

This factor represents the degree of surface activity of the carbon black. The value f represents properties of the carbon black particles per fixed degree of surface activity by dividing the nitrogen adsorption specific surface area ($N_2SA$) by the iodine adsorption number (IA). The degree of surface activity tends to be greater as the characteristic values ① and ② increase, however, if the degree of surface activity is too great, the modulus and abrasion resistance decrease in the rubber composition.

Therefore, gripping performance and abrasion resistance per fixed modulus increase as the value f increases. If the value f is less than 1.2, gripping performance and abrasion resistance become insufficient; on the other hand, if the value f exceeds 1.6, dispersibility of the carbon black in the rubber component and processability of the rubber component decrease, thereby resulting in a reduced modulus and abrasion resistance.

In addition to the above preconditions, by setting the value f calculated from the formula (1) in a specific range of the formula (2), dispersibility in the rubber of the hard-type high-structure carbon black of the present invention can be improved to provide the rubber with high hardness and a high modulus. As a result, abrasion resistance corresponding to a fixed modulus level can be retained at a high level. Therefore, the amount of carbon black, oils, and the like to be blended with the rubber component can be easily adjusted, whereby the degree of freedom in the blending design can be increased.

Values obtained by the following measuring methods are used for the above characteristics of the carbon black.

① CTAB specific surface area (m²/g)

The CTAB specific surface area is measured by ASTM D3765-89 "Standard test method for carbon black-CTAB (cetyltrimethylammoium bromide) surface area". The CTAB specific surface area of IRB #6 measured by this method is 77 m²/g.

② DBP absorption number (ml/100 g)

The DBP absorption number is measured by JIS K6221-82 "Test method for rubber black" 6.1.2A. The DBP absorption number of IRB #6 measured by this method is 99 ml/100 g.

③ 24M4DBP absorption number (ml/100 g)

The 24M4DBP absorption number is measured by ASTM D3493-85a "Standard test method for carbon black-dibutyl phthalate absorption number of compressed sample". The 24M4DBP absorption number of IRB #6 measured by this method is 87 ml/100 g.

④ Mode diameter Dst (nm) of stoke diameter distribution of aggregate and half-width ΔDst (nm)

A liquid dispersion of carbon black at a concentration of 50 mg/l is prepared by mixing a carbon black specimen dried according to JIS K6221-82 section 5 "Method of preparing dried sample" with a 20 vol % ethanol aqueous solution including a small amount of a surfactant and sufficiently dispersed by supersonic waves to obtain a specimen. After the addition of 10 ml of a spin solution (2 wt % glycerol aqueous solution at 25° C.) to a disk centrifuge apparatus (manufactured by Joyes Lobel) set at 8000 rpm, 1 ml of a buffer solution (20 vol % ethanol aqueous solution at 25° C.) is injected. After the addition of 0.5 ml of the carbon black dispersion liquid at 25° C. using a syringe, centrifugal sedimentation is started and a recorder is simultaneously turned on to record the distribution curve shown in FIG. 1 (the horizontal axis represents time elapsed after the addition of the carbon black dispersion liquid using a syringe and the vertical axis represents absorbance at a specific point changed with the centrifugal sedimentation of the carbon black). Each time T is read from this distribution curve, and substituted in the following formula (3) to calculate a stoke diameter corresponding to each time T.

$$Dst(nm) = \sqrt{\frac{3.7794 \times 10^9 \cdot \eta}{N^2 (\rho_{CB} - \rho_1)} \log \frac{r_2}{r_1}} \times \sqrt{\frac{1}{T}} \times 1000 \quad (3)$$

In the formula (3), η represents viscosity of the spin solution (0.935 cp), N represents the disk rotating speed (6000 rpm), $r_1$ represents the radius of the injection point of the carbon black dispersion liquid (4.56 cm), $r_2$ represents the radius to the absorbance measuring point (4.82 cm), $\rho_{CB}$ represents density of the carbon black (g/cm³), and $\rho_1$ represents density of the spin solution (1.00178 g/cm³).

Figure 2:
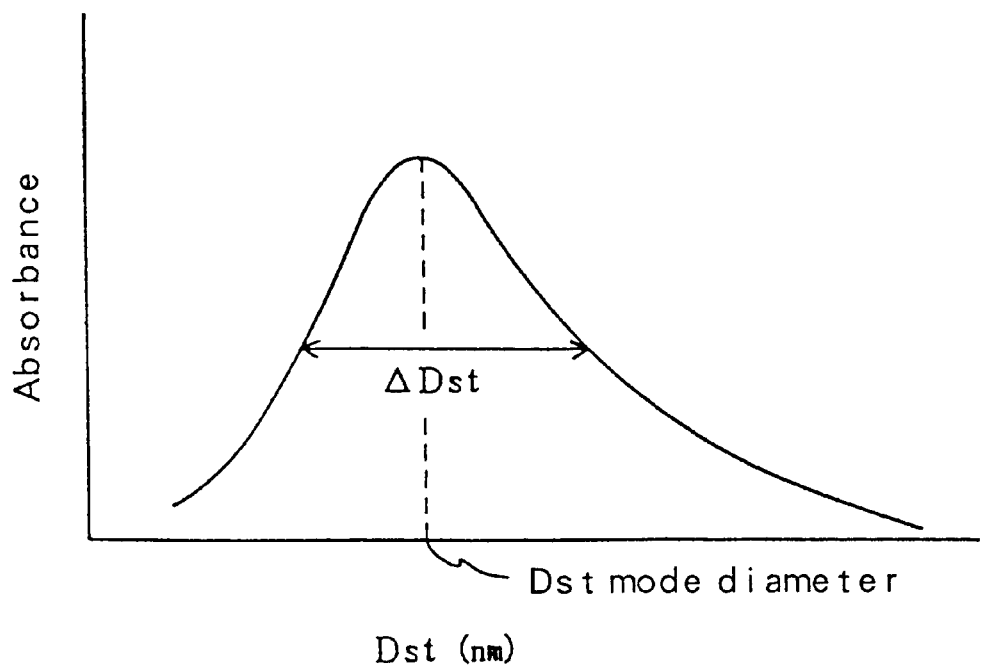
FIG. 2 a distribution curve showing the relation between stoke diameter and absorbance obtained at the time of measurement of Dst.

The stoke diameter (mode diameter) at the highest frequency in a distribution curve (FIG. 2) of the stoke diameter and absorbance thus obtained is determined as Dst (nm). The difference between the largest and smallest values of half the stoke diameter at the highest frequency (half-width) is determined as ΔDst (nm). Dst and ΔDst of ASTM D-24 Standard Reference Black C-3 (N234) measured by this method are 80 nm and 60 nm, respectively.

⑤ Tint (specific tinting strength) (%)

A reference specimen is measured as IRB #3 according to JIS K6221-82 "Test method for rubber black" 6.1.3. The Tint of IRB #6 measured by this method is 100.

⑥ N₂SA (nitrogen adsorption specific surface area) (m²/g);

N₂SA is measured by ASTM D3037-88 "Standard test method for carbon black-surface area by nitrogen absorption" Method B. N₂SA of IRB #6 measured by this method is 76 m²/g.

⑦ IA (iodine adsorption number) (mg/g);

IA is measured by JIS K6221-82 "Test method for rubber black" 6.1.1. The IA of IRB #6 measured by this method is 80 mg/g.

The rubber composition of the present invention comprises 20–150 parts by weight of the hard-type high-structure carbon black according to the present invention provided with the above characteristics for 100 parts by weight of rubber components such as natural rubbers, synthetic rubbers such as a styrene-butadiene rubber, polybutadiene rubber, and polyisoprene rubber, or blends of these rubbers. If the proportion of the carbon black is less than 20 parts by weight, the reinforcing effect is insufficient. If the proportion exceeds 150 parts by weight, mixing processability markedly decreases due to increased viscosity when mixed with the rubber components. The carbon black and rubber components are mixed with necessary components such as vulcanizing agents, vulcanization accelerators, aging preventives, vulcanization improvers, softening agents, and plasticizers to obtain the rubber composition.

The hard-type high-structure carbon black provided with the characteristics of the present invention can be manufactured by using a reactor consisting of a combustion chamber equipped with a tangential air supply and an axial combustion burner at the nose, a narrow-diameter multi-stage reaction chamber equipped with a raw material oil supply nozzle, and a wide-diameter reaction chamber which are installed next to the combustion chamber on the same axis, while controlling the reaction conditions such as raw material oil introduction conditions, the amount of fuel oil and raw material oil, and reaction time (residence time for the combustion gas from the introduction of the last raw material oil to termination of the reaction).

EXAMPLES

Examples of the present invention will be described below in comparison with Comparative Examples.

(1) Manufacture of Carbon Black Examples 1–8, Comparative Examples 1, 3, 6, and 8

Figure 3:
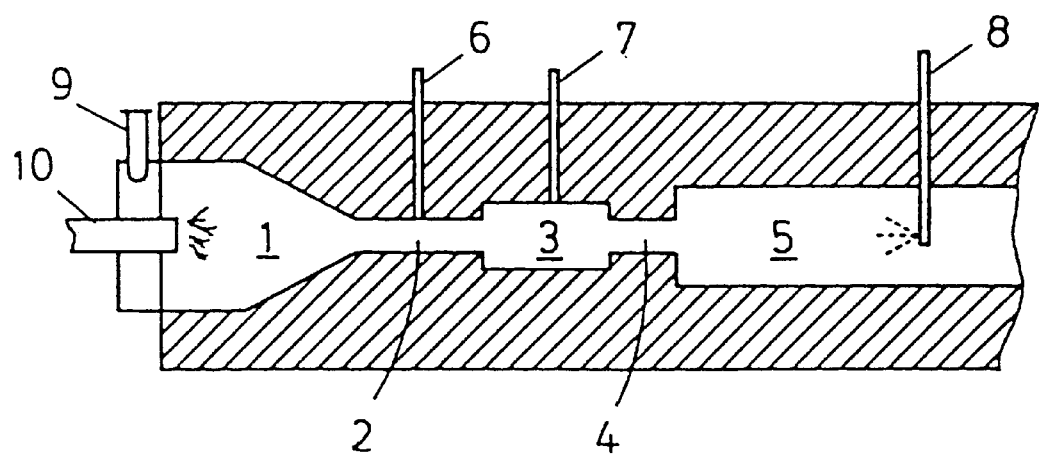
FIG. 3 is a schematic cross section illustrating a reactor used for manufacturing carbon black of the present invention.

Carbon black was manufactured using a reactor shown in FIG. 3. The reactor shown in FIG. 3 consists of a combustion chamber 1 with a gradually converging outlet (internal diameter: 700 mm, length 500 mm, length of converging part: 150 mm) equipped with a tangential air supply and an axial combustion burner at the nose, a 1st stage narrow-diameter reaction chamber 2 (internal diameter: 150 mm, length: 400 mm), 2nd stage narrow-diameter reaction chamber 3 (internal diameter: 200 mm, length: 300 mm), 3rd stage narrow-diameter reaction chamber 4 (internal diameter: 170 mm, length: 200 mm), and wide-diameter reaction chamber 5 (internal diameter: 500 mm, length: 3000 mm) which are installed on the same axis as the combustion chamber, wherein the 1st stage narrow-diameter reaction chamber 2 is equipped with a raw material oil supply nozzle 6, the 2nd stage narrow-diameter reaction chamber 3 is equipped with a raw material oil supply nozzle 7, and the wide-diameter reaction chamber 5 is equipped with a cooling water nozzle 8 for terminating the reaction. Using this reactor, carbon black having various characteristics were manufactured by using an aromatic hydrocarbon oil with a specific gravity (15/4° C.) of 1.137, viscosity (Engler degree: 40/20° C.) of 2.10, toluene insoluble content of 0.05%, correlation coefficient (BMCI) of 140, and initial boiling point of 203° C. as a raw material oil and a hydrocarbon oil with a specific gravity (15/4° C.) of 0.977, viscosity (Cst/50° C.) of 16.1, carbon residual content of 5.4%, and flash point of 96° C. as a fuel oil while changing the reaction conditions.

Comparative Examples 2, 4, 5, and 7

Figure 4:
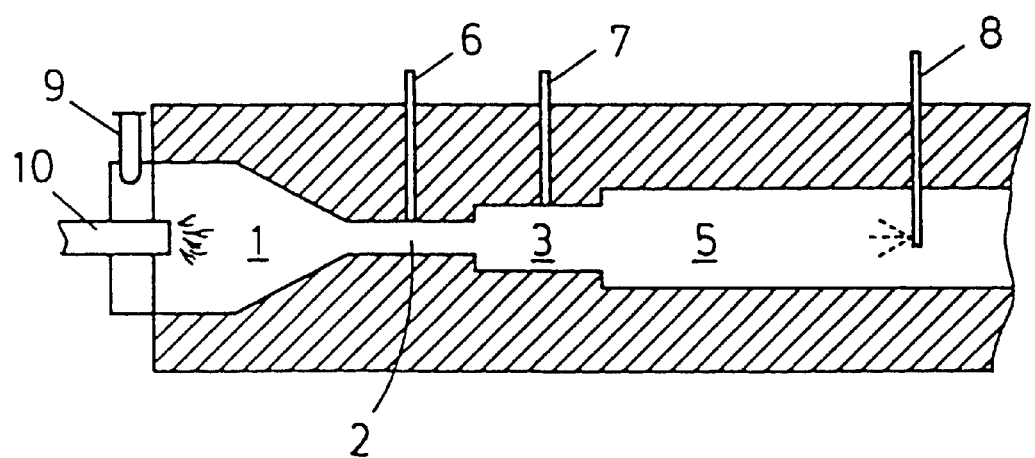
FIG. 4 is a schematic cross section illustrating a reactor used for manufacturing carbon black of Comparative Examples.

Carbon black was manufactured using the reactor shown in FIG. 4. The reactor shown in FIG. 4 consists of a combustion chamber 1 with a gradually converging outlet (internal diameter: 700 mm, length 500 mm, length of converged part: 150 mm) equipped with a tangential air supply and an axial combustion burner at the nose, a 1st stage narrow-diameter reaction chamber 2 (internal diameter: 150 mm, length: 400 mm), 2nd stage narrow-diameter reaction chamber 3 (internal diameter: 200 mm, length: 300 mm), and wide-diameter reaction chamber 5 (internal diameter: 500 mm, length: 3000 mm) which are installed on the same axis as the combustion chamber, wherein the 1st stage narrow-diameter reaction chamber 2 is equipped with a raw material oil supply nozzle 6, the 2nd stage narrow-diameter reaction chamber 3 is equipped with a raw material oil supply nozzle 7, and the wide-diameter reaction chamber 5 is equipped with a cooling water nozzle 8 for terminating the reaction. Using this reactor, carbon blacks having various characteristics were manufactured using the same raw material oil and fuel oil as in the Examples while changing the reaction conditions.

The manufacturing conditions and characteristics of the resulting carbon black are shown in Table 1 (Examples) and Table 2 (Comparative Examples). Characteristics of three kinds of commercially available hard carbon black are shown in Table 3 as reference.

TABLE 1

| | Example | | | | | | | |
|---|---|---|---|---|---|---|---|---|
| | 1 | 2 | 3 | 4 | 5 | 6 | 7 | 8 |
| (Manufacturing condition) | | | | | | | | |
| Total amount of air supply (Nm³/H) | 1000 | 1500 | 1800 | 2300 | 1700 | 1500 | 1800 | 2000 |
| Amount of fuel oil supply (Nm³/H) | 62 | 74 | 89 | 134 | 94 | 74 | 105 | 110 |
| Fuel atomized air (Nm³/H) | 150 | 150 | 150 | 150 | 150 | 150 | 150 | 150 |
| Fuel combustion rate (%) | 160 | 200 | 200 | 170 | 180 | 200 | 170 | 180 |
| Amount of raw material oil at 1st stage (Kg/H) | 166 | 247 | 274 | 295 | 207 | 178 | 183 | 195 |

TABLE 1-continued

| | Example | | | | | | | |
|---|---|---|---|---|---|---|---|---|
| | 1 | 2 | 3 | 4 | 5 | 6 | 7 | 8 |
| Amount of raw material oil at 2nd stage (Kg/H) | 153 | 194 | 199 | 228 | 147 | 115 | 122 | 122 |
| Reaction time (mmsec.) | 440 | 235 | 163 | 96 | 280 | 357 | 340 | 357 |
| (Characteristic) | | | | | | | | |
| CTAB (m²/g) | 75 | 88 | 105 | 121 | 146 | 170 | 200 | 245 |
| DBP (ml/100 g) | 152 | 158 | 162 | 145 | 157 | 156 | 147 | 135 |
| 24M4DBP (ml/100 g) | 118 | 128 | 130 | 116 | 128 | 130 | 125 | 116 |
| DBP-24M4DBP | 34 | 30 | 32 | 29 | 29 | 26 | 22 | 19 |
| Dst (nm) | 113 | 102 | 93 | 82 | 76 | 68 | 60 | 54 |
| ΔDst (nm) | 74 | 75 | 64 | 55 | 52 | 49 | 44 | 35 |
| ΔDst/Dst | 0.66 | 0.74 | 0.69 | 0.67 | 0.68 | 0.72 | 0.73 | 0.65 |
| Tint (%) | 96 | 107 | 115 | 122 | 126 | 132 | 137 | 142 |
| $N_2SA$ (m²/g) | 77 | 92 | 115 | 131 | 162 | 194 | 252 | 300 |
| IA (mg/g) | 70 | 85 | 107 | 118 | 173 | 207 | 270 | 322 |
| F value | 1.22 | 1.41 | 1.42 | 1.28 | 1.55 | 1.58 | 1.53 | 1.34 |

TABLE 2

| | Comparative Example | | | | | | | |
|---|---|---|---|---|---|---|---|---|
| | 1 | 2 | 3 | 4 | 5 | 6 | 7 | 8 |
| (Manufacturing condition) | | | | | | | | |
| Total amount of air supply (Nm³/H) | 1800 | 2200 | 2000 | 2400 | 1500 | 1700 | 1700 | 2000 |
| Amount of fuel oil supply (Nm³/H) | 89 | 137 | 110 | 95 | 74 | 94 | 68 | 110 |
| Fuel atomized air (Nm³/H) | 150 | 150 | 150 | 150 | 150 | 150 | 150 | 150 |
| Fuel combustion rate (%) | 200 | 160 | 180 | 250 | 200 | 180 | 250 | 180 |
| Amount of raw material oil at 1st stage (Kg/H) | 247 | 252 | 337 | 443 | 0 | 178 | 283 | 145 |
| Amount of raw material oil at 2nd stage (Kg/H) | 283 | 297 | 124 | 150 | 293 | 116 | 0 | 104 |
| Reaction time (mmsec.) | 244 | 160 | 157 | 92 | 317 | 315 | 360 | 357 |
| (Characteristic) | | | | | | | | |
| CTAB (m²/g) | 63 | 78 | 97 | 126 | 150 | 175 | 220 | 280 |
| DBP (ml/100 g) | 153 | 148 | 166 | 138 | 127 | 137 | 131 | 132 |
| 24M4DBP (ml/100 g) | 120 | 117 | 121 | 116 | 100 | 118 | 105 | 117 |
| DBP-24M4DBP | 33 | 31 | 45 | 22 | 27 | 19 | 26 | 15 |
| Dst (nm) | 120 | 110 | 90 | 86 | 73 | 62 | 58 | 54 |
| ΔDst (nm) | 94 | 102 | 70 | 65 | 58 | 45 | 40 | 35 |
| ΔDst/Dst | 0.78 | 0.93 | 0.78 | 0.76 | 0.80 | 0.73 | 0.69 | 0.65 |
| Tint (%) | 85 | 91 | 120 | 122 | 127 | 139 | 140 | 145 |
| $N_2SA$ (m²/g) | 65 | 80 | 103 | 138 | 162 | 203 | 278 | 345 |
| IA (mg/g) | 58 | 78 | 101 | 125 | 164 | 217 | 295 | 375 |
| F value | 1.20 | 1.21 | 1.63 | 1.18 | 1.17 | 1.62 | 1.22 | 1.22 |

TABLE 3

| | Reference Example[*1] | | | |
|---|---|---|---|---|
| | 1 | 2 | 3 | 4 |
| (Characteristic) | | | | |
| CTAB (m²/g) | 91 | 114 | 119 | 128 |
| DBP (ml/100 g) | 119 | 116 | 125 | 137 |
| 24M4DBP (ml/100 g) | 98 | 98 | 100 | 118 |
| Tint (%) | 109 | 115 | 124 | 123 |
| $N_2SA$ (m²/g) | 93 | 117 | 126 | 142 |
| IA (mg/g) | 90 | 121 | 121 | 152 |

[*1] Reference Example 1: N339 grade carbon black
Reference Example 2: N220 grade carbon black
Reference Example 3: N234 grade carbon black
Reference Example 4: N135 grade carbon black (2) Preparation of Rubber Composition Rubber compositions were prepared by blending these carbon blacks with a natural rubber in the ratio shown in Table 4 and vulcanizing the blended products at 145° C. for 30 minutes.

TABLE 4

| Component | Blending ratio |
|---|---|
| Natural rubber ($R_{ss}$ #1) | 100 |
| Carbon black | Variable |
| Aromatic oil | 4 |
| Stearic acid (dispersion vulcanization improver) | 3 |
| Zinc oxide (vulcanization improver) | 5 |
| Dibenzothiazylsulfenamide (vulcanization accelerator) | 1 |
| Sulphur (vulcanization agent) | 2.5 |

(3) Rubber Property Test

Various rubber tests were carried out on the resulting rubber compositions and the results are shown in Table 5 (Examples), Table 6 (Comparative Examples), and Table 7 (Reference Examples). Of these rubber tests, loss factor (tanδ), abrasion loss, and dispersion ratio were measured by methods described below. Mooney viscosity (Mv) was measured by JIS K6300 "Physical testing method for unvulcanized rubber" and other measurements were according to JIS K6301 "Physical testing method for vulcanized rubber". The data for rubber properties is shown by an index provided that the properties of the rubber composition comprising N234 grade carbon black in Reference Example 3 is 100.

Loss Factor (tanδ):

The loss factor was measured under the following conditions using a Visco Elastic Spectrometer (manufactured by Iwamoto Manufacturing Co., Ltd.). The loss factor (tanδ) is an index for heat build-up and gripping performance. A greater index shows higher heat build-up and superior gripping performance.

Test specimen: thickness; 2 mm, length; 35 mm, width; 5 mm;

Frequency: 50 Hz;

Dynamic distortion factor: 1.2%;

Temperature: 60° C.

Lanbourn Abrasion Loss (LA):

Lanbourn abrasion loss was measured under the following conditions using a Lanbourn abrasion tester (mechanical slipping system). A higher index shows superior abrasion resistance.

Test specimen: thickness; 10 mm, outside diameter; 44 mm

Emery wheel: GC type, particle size; #80, hardness; H Carborundum powder added: particle size; #80, amount added; about 9 g/min.

Relative slipping factor of surface of emery wheel and test specimen: 24%, 60%

Rotational frequency of test specimen: 535 rpm

Test load: 4 kg

Dispersion ratio:

A dispersion ratio was measured by ASTM D2663-95a Method B "Standard test method for carbon black-dispersion in rubber". The dispersion ratio of IRB #6 measured by this method is 99%.

TABLE 5

| | Example | | | | | | | |
|---|---|---|---|---|---|---|---|---|
| | 1 | 2 | 3 | 4 | 5 | 6 | 7 | 8 |
| CB blending amount (parts by weight) | 50 | 45 | 50 | 41 | 50 | 43 | 50 | 45 | 50 | 50 | 50 | 50 |
| Hardness (Hs) | 104 | 99 | 107 | 101 | 105 | 100 | 103 | 99 | 103 | 100 | 96 | 94 |
| 300% modulus (M300) | 133 | 102 | 143 | 105 | 136 | 101 | 125 | 98 | 111 | 99 | 88 | 67 |
| Tensile strength (TB) | 88 | 95 | 92 | 98 | 95 | 100 | 98 | 103 | 104 | 108 | 103 | 96 |
| Elongation (EB) | 92 | 100 | 83 | 98 | 88 | 102 | 94 | 102 | 96 | 101 | 107 | 115 |
| Impact resilience (Reb) | 116 | 123 | 112 | 120 | 106 | 114 | 98 | 108 | 92 | 88 | 86 | 81 |
| Abrasion resistance (LA24) | 92 | 92 | 97 | 100 | 106 | 105 | 107 | 112 | 110 | 108 | 103 | 96 |
| Abrasion resistance (LA60) | 128 | 111 | 136 | 115 | 133 | 117 | 123 | 117 | 118 | 111 | 105 | 95 |
| Loss factor (tan δ) | 75 | 64 | 84 | 69 | 98 | 85 | 103 | 90 | 107 | 113 | 117 | 124 |
| Mooney viscosity ML1 + 4 | 100 | 88 | 103 | 89 | 107 | 95 | 106 | 95 | 110 | 114 | 117 | 120 |
| Absolute dispersion rate (%) | 99 | 99 | 99 | 99 | 99 | 99 | 99 | 97 | 96 | 92 | 87 | 82 |

(Note) Rubber properties are shown by an index, assuming that the rubber testing data of Reference Example 3 is 100.

TABLE 6

| | Comparative Example | | | | | | | |
|---|---|---|---|---|---|---|---|---|
| | 1 | 2 | 3 | 4 | 5 | 6 | 7 | 8 |
| CB blending amount (parts by weight) | 50  45 | 50  45 | 50  45 | 50 | 50 | 50 | 50 | 50 |
| Hardness (Hs) | 103  98 | 105  101 | 104  100 | 101 | 93 | 95 | 90 | 88 |
| 300% modulus (M300) | 118  96 | 121  100 | 118  99 | 105 | 88 | 77 | 65 | 56 |
| Tensile strength (TB) | 81  85 | 87  90 | 92  96 | 95 | 103 | 100 | 94 | 88 |
| Elongation (EB) | 95  103 | 93  100 | 94  105 | 98 | 104 | 109 | 114 | 118 |
| Impact resilience (Reb) | 114  124 | 105  110 | 101  109 | 97 | 93 | 87 | 85 | 81 |
| Abrasion resistance (LA24) | 80  82 | 91  85 | 93  92 | 97 | 101 | 95 | 91 | 84 |
| Abrasion resistance (LA60) | 105  95 | 109  101 | 110  102 | 103 | 92 | 87 | 78 | 80 |
| Loss factor (tan δ) | 76  69 | 87  80 | 98  92 | 105 | 111 | 118 | 122 | 128 |
| Mooney viscosity ML1 + 4 | 97  84 | 100  88 | 110  96 | 105 | 105 | 117 | 114 | 122 |
| Absolute dispersion rate (%) | 99  99 | 96  95 | 87  85 | 88 | 77 | 64 | 65 | 70 |

(Note) Rubber properties are shown by an index, assuming that the rubber testing data of Reference Example 3 is 100.

TABLE 7

| | Reference Example | | | |
|---|---|---|---|---|
| | 1 | 2 | 3 | 4 |
| CB blending amount (parts by weight) | 50 | 50 | 50 | 50 |
| hardness (Hs) | 100 | 99 | 100 | 103 |
| 300% modulus (M300) | 104 | 89 | 100 | 102 |
| Tensile strength (TB) | 93 | 96 | 100 | 98 |
| Elongation (EB) | 96 | 96 | 100 | 100 |
| impact resilience (Reb) | 108 | 97 | 100 | 95 |
| Abrasion resistance (LA24) | 89 | 92 | 100 | 99 |
| Abrasion resistance (LA60) | 98 | 96 | 100 | 108 |
| Loss factor (tan δ) | 86 | 95 | 100 | 105 |
| Mooney viscosity ML1 + 4 | 87 | 89 | 100 | 117 |
| Absolute dispersion rate (%) | 95 | 93 | 90 | 83 |

(Note)
Rubber properties are shown by an index, assuiming that the rubber testing data of Reference Example 3 is 100.

Figure 5:
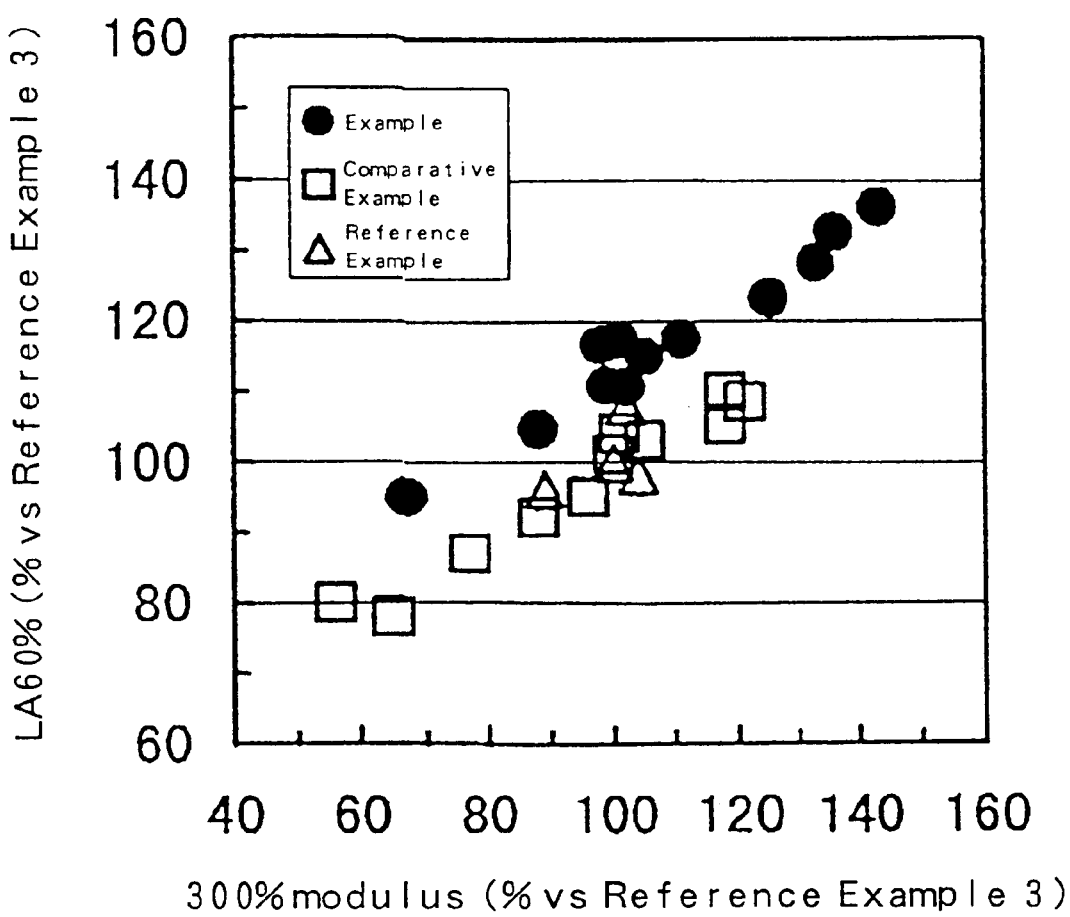
FIG. 5 is a graph showing the relation between a 300% modulus (M300) and abrasion resistance (LA60) in Examples, Comparative Examples, and Reference Examples.
Figure 6:
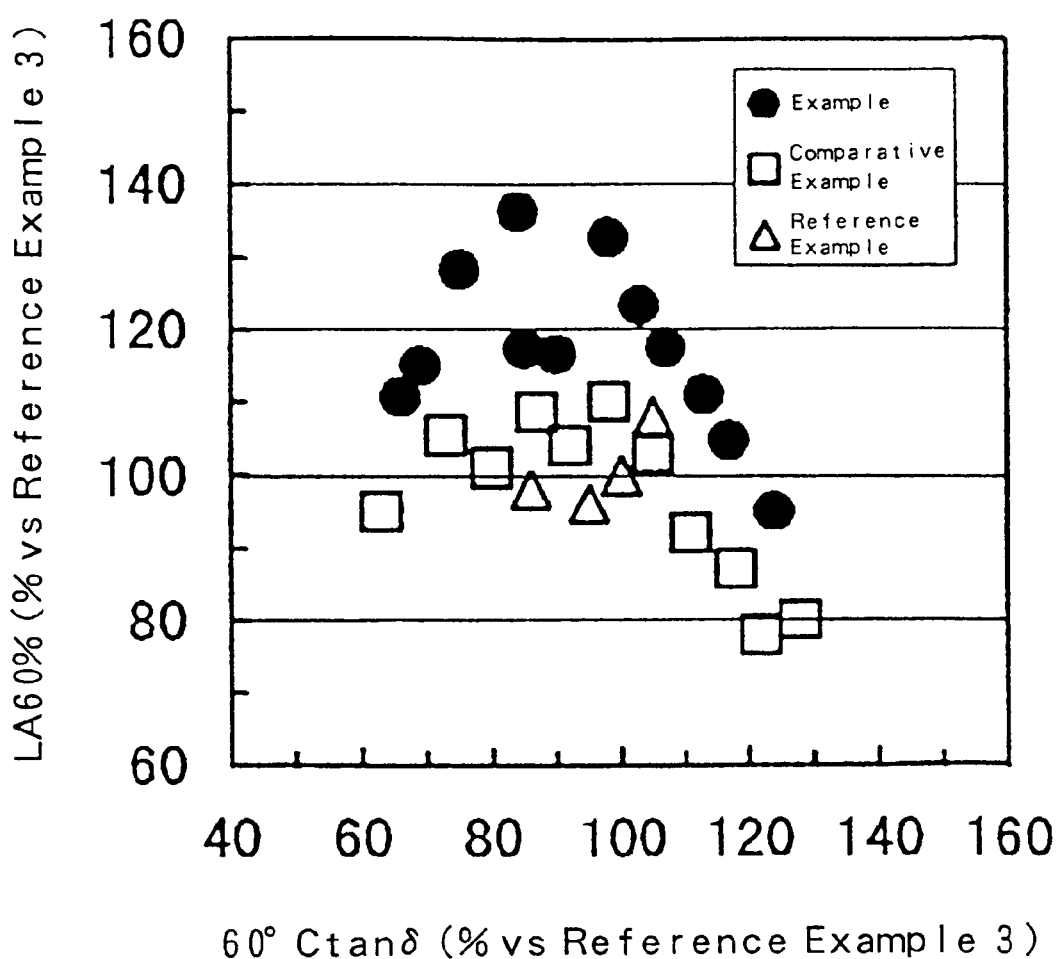
FIG. 6 is a graph showing the relation between a loss factor (tanδ) and abrasion resistance (LA60) in Examples, Comparative Examples, and Reference Examples.
Figure 7:
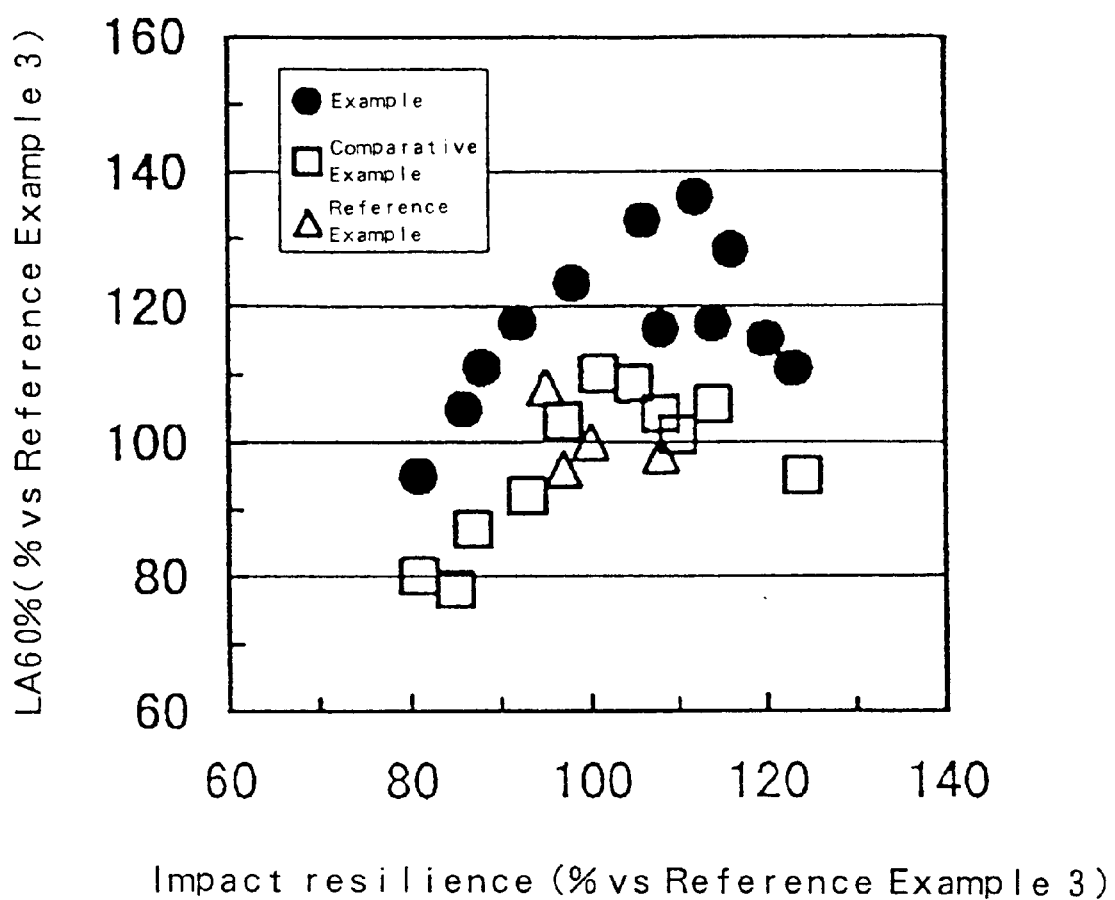
FIG. 7 is a graph showing the relation between impact resilience (Reb) and abrasion resistance (LA60) in Examples, Comparative Examples, and Reference Examples.

The relation between the 300% modulus (M300) and the abrasion resistance (LA60) is shown in FIG. 5, the relation between the loss factor (tanδ) and the abrasion resistance (LA60) is shown in FIG. 6, and the relation between the impact resilience (Reb) and the abrasion resistance (LA60) is shown in FIG. 7.

From the results shown in Tables 1–3, Tables 5–7, and FIGS. 3–5, compared to the rubber compositions in Comparative Examples and Reference Examples in which the carbon black which did not satisfy the characteristics of the present invention was blended, the rubber compositions in Examples in which the carbon black satisfying the characteristics of the present invention was blended exhibited high abrasion resistance corresponding to the modulus. When the modulus was set at a fixed level, the abrasion resistance was at a relatively high level. Moreover, the rubber compositions in Examples exhibited high abrasion resistance corresponding to the loss factor and high abrasion resistance corresponding to the impact resilience. When the loss factor and the impact resilience were set at fixed levels, the abrasion resistance was at a relatively high level. Therefore, since the amount of carbon black, oils, and the like to be blended with the rubber component can be easily adjusted, the degree of freedom in the blending design can be increased.

As described above, the carbon black of the present invention is capable of providing the rubber comprising the carbon black with a high modulus and superior abrasion resistance and a good balance of gripping performance such as a loss factor and impact resilience. Therefore, the hard-type high-structure carbon black and the rubber composition comprising the carbon black of the present invention can be suitably used for tire treads for various automobiles due to high abrasion resistance corresponding to a fixed modulus level. Moreover, the present invention can be applied to high performance tires for which a high modulus and gripping performance are required.

Obviously, numerous modifications and variations of the present invention are possible in light of the above teachings. It is therefore to be understood that, within the scope of the appended claims, the invention may be practiced otherwise than as specifically described herein.

What is claimed is:

1. A hard high-structure carbon black having characteristics of $70 \leq CTAB \leq 250$, $130 \leq DBP$, $115 \leq 24M4DBP$, $DBP-24M4DBP \leq 40$, $\Delta Dst/Dst \leq 0.8$, and a correlation factor f calculated by the following formula (1) satisfying the following formula (2):

$$f = (Tint/CTAB) \cdot (24M4DBP/Dst)/(N_2SA/IA) \qquad (1)$$

$$1.2 \leq f \leq 1.6 \qquad (2)$$

wherein CTAB represents a CTAB specific surface area (m$^2$/g), DBP represents a DBP absorption number (ml/100 g), 24M4DBP represents a compressed DBP absorption number (ml/100 g), Dst represents a mode diameter of stoke diameter distribution of a carbon black aggregate measured by a disk centrifuge apparatus (DCF) (nm), $\Delta$Dst represents a half-width of the stoke diameter distribution (nm), Tint represents specific tinting strength (%), N$_2$SA represents a nitrogen adsorption specific surface area (m$^2$/g), and IA represents iodine adsorption number (mg/g).

2. The hard high-structure carbon black according to claim 1, wherein the CTAB is in the range of $70 \leq CTAB \leq 200$.

3. The hard high-structure carbon black according to claim 1, wherein DBP-24M4DBP is in the range of DBP-24M4DBP$\leq 35$.

4. The hard high-structure carbon black according to claim 1, wherein $\Delta Dst/Dst$ is in the range of $\Delta Dst/Dst \leqq 0.75$.

5. The hard high-structure carbon black according to claim 1, wherein the CTAB, DBP-24M4DBP, and $\Delta Dst/Dst$ are in the ranges of $70 \leqq CTAB \leqq 200$, DBP-24M4DBP$\leqq 35$, and $\Delta Dst/Dst \leqq 0.75$, respectively.

6. A rubber composition comprising 20–150 parts by weight of the hard high-structure carbon black according to claim 1 for 100 parts by weight of natural rubbers, synthetic rubbers, or blends of these rubbers.

* * * * *